(12) United States Patent
Buss et al.

(10) Patent No.: US 6,782,684 B2
(45) Date of Patent: Aug. 31, 2004

(54) CUTTING IMPLEMENT INCLUDING FLOW DIVERTER BAFFLE

(75) Inventors: Steven Henry Buss, Horicon, WI (US); Todd Lynn Smith, Beaver Dam, WI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/902,077

(22) Filed: Jul. 9, 2001

(65) Prior Publication Data

US 2003/0005679 A1 Jan. 9, 2003

(51) Int. Cl.$^7$ .................. A01D 34/66; A01D 67/00
(52) U.S. Cl. ..................... 56/320.2; 56/320.1
(58) Field of Search .................. 56/320.1, 295, 56/320.2, 255, 17.4, 17.5, DIG. 20

(56) References Cited

U.S. PATENT DOCUMENTS

| | | | |
|---|---|---|---|
| 3,673,772 A | | 7/1972 | Holzhei .................. 56/13.1 |
| 3,851,452 A | * | 12/1974 | Brocas .................. 56/17.4 |
| 4,502,271 A | * | 3/1985 | Hansen et al. .................. 56/13.6 |
| 4,543,773 A | | 10/1985 | Reilly |
| 5,191,756 A | | 3/1993 | Kuhn .................. 56/17.5 |
| 5,267,429 A | | 12/1993 | Kettler et al. .................. 56/295 |
| 5,457,947 A | | 10/1995 | Samejima et al. |
| 5,483,790 A | | 1/1996 | Kuhn et al. .................. 56/17.5 |
| 5,488,821 A | | 2/1996 | McCunn et al. .................. 56/320.2 |
| 5,609,011 A | | 3/1997 | Kuhn et al. .................. 56/17.5 |
| 5,628,171 A | * | 5/1997 | Stewart et al. .................. 56/320.2 |
| 5,765,346 A | | 6/1998 | Benter et al. .................. 56/2 |
| 5,845,475 A | * | 12/1998 | Busboom et al. .................. 56/17.4 |
| 5,860,272 A | | 1/1999 | Griffin .................. 56/320.1 |
| 5,884,466 A | * | 3/1999 | Willmering et al. .................. 56/320.1 |
| 5,921,072 A | * | 7/1999 | Cargile .................. 56/17.5 |
| 5,987,863 A | | 11/1999 | Busboom et al. .................. 56/320.1 |
| 6,038,840 A | | 3/2000 | Ishimori et al. |
| 6,065,276 A | * | 5/2000 | Hohnl et al. .................. 56/320.1 |
| 6,073,430 A | * | 6/2000 | Mullet et al. .................. 56/13.4 |
| 6,189,307 B1 | * | 2/2001 | Buss et al. .................. 56/2 |
| 6,192,666 B1 | * | 2/2001 | Sugden et al. .................. 56/13.6 |

FOREIGN PATENT DOCUMENTS

| | | |
|---|---|---|
| DE | 295 12 057 | 7/1995 |
| EP | 1 186 221 | 3/2002 |
| FR | 2 548 864 | 1/1985 |
| FR | 2 643 213 | 8/1990 |
| GB | 2 347 838 | 9/2000 |
| JP | 1 010913 A | 1/1989 |

OTHER PUBLICATIONS

John Deere Parts Catalog—PC 2725, "Mower Deck Baffles", pp. 55–56, 60–68, and 60-10, date of publication Jan. 31, 2001, published in U.S.A.

Copies of nine (9) photographs of baffles used with mower decks manufactured by John Deere, photographs taken by a Deere and Company employee in Jun. and Oct. 2001 in U.S.A.

* cited by examiner

Primary Examiner—Árpád F Kovács

(57) ABSTRACT

A cutting implement which includes a baffle for directing the flow of air and vegetation caused by the rotation of cutting blades of the implement. The baffle serves to intercept the flows of air and vegetation of adjacent chambers to accelerate the discharge of cut material. Further, the baffle directs cut material above the cutting plane of the blade to permit the blade to raise and cut vegetation in its path when that vegetation has previously been matted down by at least one of the tires on the tractor on which it is carried.

8 Claims, 5 Drawing Sheets

US 6,782,684 B2

CUTTING IMPLEMENT INCLUDING FLOW DIVERTER BAFFLE

FIELD OF THE INVENTION

This invention relates to tractor cutting implements having multiple cutting chambers, and more specifically, to structure for assisting at least one chamber's cutting blade to more effectively lift and cut the vegetation in its path.

BACKGROUND OF THE INVENTION

Cutting implements which are usable with lawn and garden tractors and which have multiple cutting chambers are often carried or mounted with the tractor at the middle thereof. The tractor, itself, typically has four wheels on which it is supported whereby two wheels are placed at its front and two wheels are placed at its rear. As they roll across the ground, the front wheels mat or knock down the vegetation or grass that they have passed over before it is to be cut by the blades of the implement. As a result, some of the grass that is knocked down is not adequately lifted or raised by the blades of the implement causing a strip of poorly cut or uncut grass to be left within the path that the mower has just traveled.

Specifically, the difficulty mentioned above has occurred in the use of three spindle implements having, correspondingly, three cutting chambers. Even more specifically, the difficulty has arisen with the right hand cutting chamber. Here, grass that has been knocked down under the right front wheel is not properly lifted, or raised to a stance permitting it to be adequately cut, by the right hand blade as the tractor passes.

When grass is cut using an implement having three chambers, a stream of material consisting of air and grass is created by the rotation of the blades within each of those chambers. The first stream typically begins at the far left chamber and is thrust along its inside front wall and the inside front walls of the center and right chambers to an opening adjacent the right chamber where it is then discharged from the implement. When moving from the center chamber into the right chamber of the implement, a combined stream from the left and center chambers clashes with the stream that is swirling inside the right chamber as the blade therein continues to rotate. As a result, it has been found that the grass in the path of the right wheel is not being adequately lifted since an area of turbulence, or disruption in the smooth flow of the combined stream mentioned above, exists across that path.

The presence of this turbulent area makes it difficult for the blade to lift or raise the grass to enable it to stand upright and be sliced as the blade passes. The grass is unable to stand up because this turbulent area continues to beat it down after it has already been knocked over by the right or tire in front of that area of turbulence. Accordingly, the grass in the path of the right front tire is unable to straighten and be effectively mowed.

Thus, it would be beneficial to provide a mechanism that enables grass in the path of the right front mower wheel to straighten and be effectively raised and cut by the mower.

SUMMARY OF THE INVENTION

Accordingly, there is provided a mechanism that permits the grass in the path of the right front tire to straighten and be properly cut as the tractor passes over that path. The mechanism provided is a baffle in the form of a steel strip that is mounted, preferably by welding, to the inside front walls of the center and right chambers.

To enable the grass to straighten as mentioned, the strip creates a void in which the grass has an opportunity to stand back up after the tractor tire has traveled over it. Additionally, and perhaps more importantly, the void is created since the strip provides a flow direction channel or pathway that reduces turbulence among the flows of air and grass in the area in which the center and right chambers of the deck meet.

To minimize this turbulence, the channel permits a substantial portion of the streams of air and grass flowing from the left and center chambers to be lifted away from the ground surface. Afterward, these streams or flows from the left and center chambers move within the channel to a discharge opening where they are then thrown from the implement.

With movement of these flows up and away from the ground surface, turbulence once caused by the meeting of the above flows with that flow caused by rotation of the right blade is substantially reduced.

As a result of the baffle strip's ability to direct a major portion of the flows from the left and center chambers into the channel, an area of minimal disturbance exists where the flows of the left and center chambers previously met that of the right chamber. Accordingly, grass and other such vegetation knocked down by the tractor's right wheel is permitted to straighten in an area under the strip without being further beaten down by the above area of turbulence. As a result, the right hand cutting blade can properly cut the vegetation falling within its cutting plane and then convey that vegetation within the inside of the implement so that it may then be discharged therefrom.

Thus, there is provided a mechanism that permits the cutting implement to which it is attached to effectively cut and convey vegetation within and from its travel path, respectively.

DESCRIPTION OF THE PREFERRED EMBODIMENT

Figure 1:
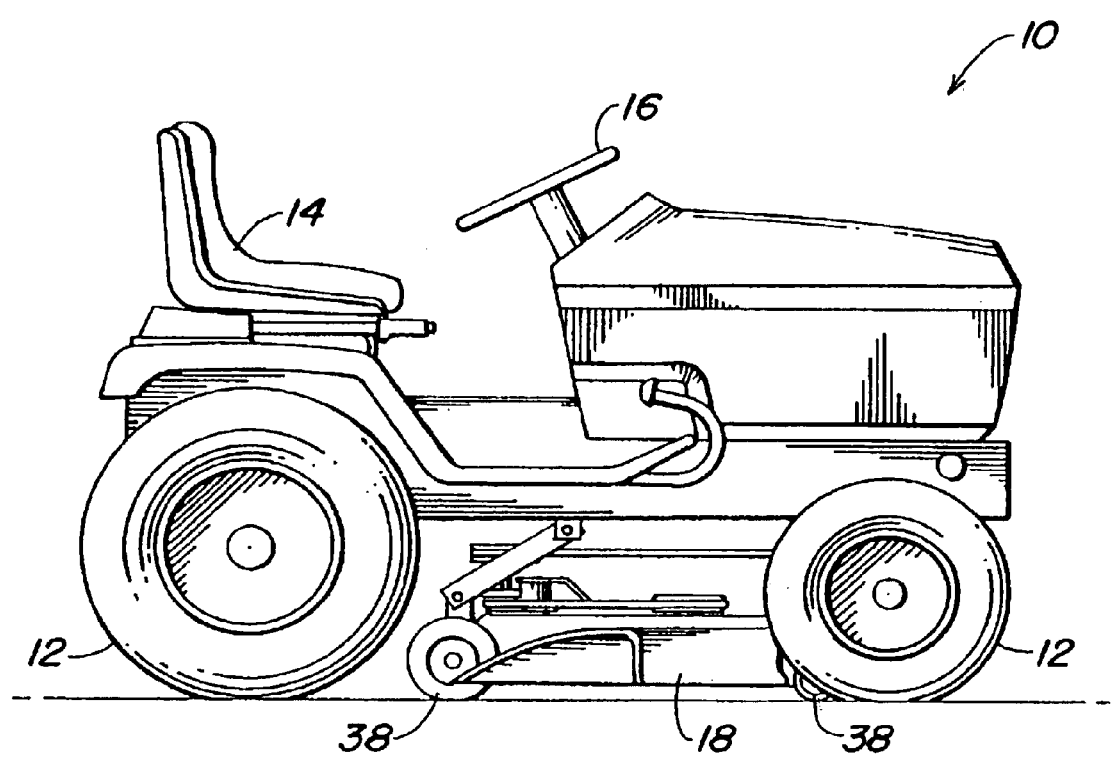
FIG. 1 is a side view of a lawn and garden tractor having a cutting deck mounted at its mid-portion.

Looking to FIG. 1, there is provided a lawn and garden tractor 10 supported upon a plurality of ground engaging wheels 12 and includes a seat 14 and a steering wheel 16. Further included as part of the tractor is a multi-chamber cutting implement or deck 18 mounted to the middle thereof.

Figure 2:
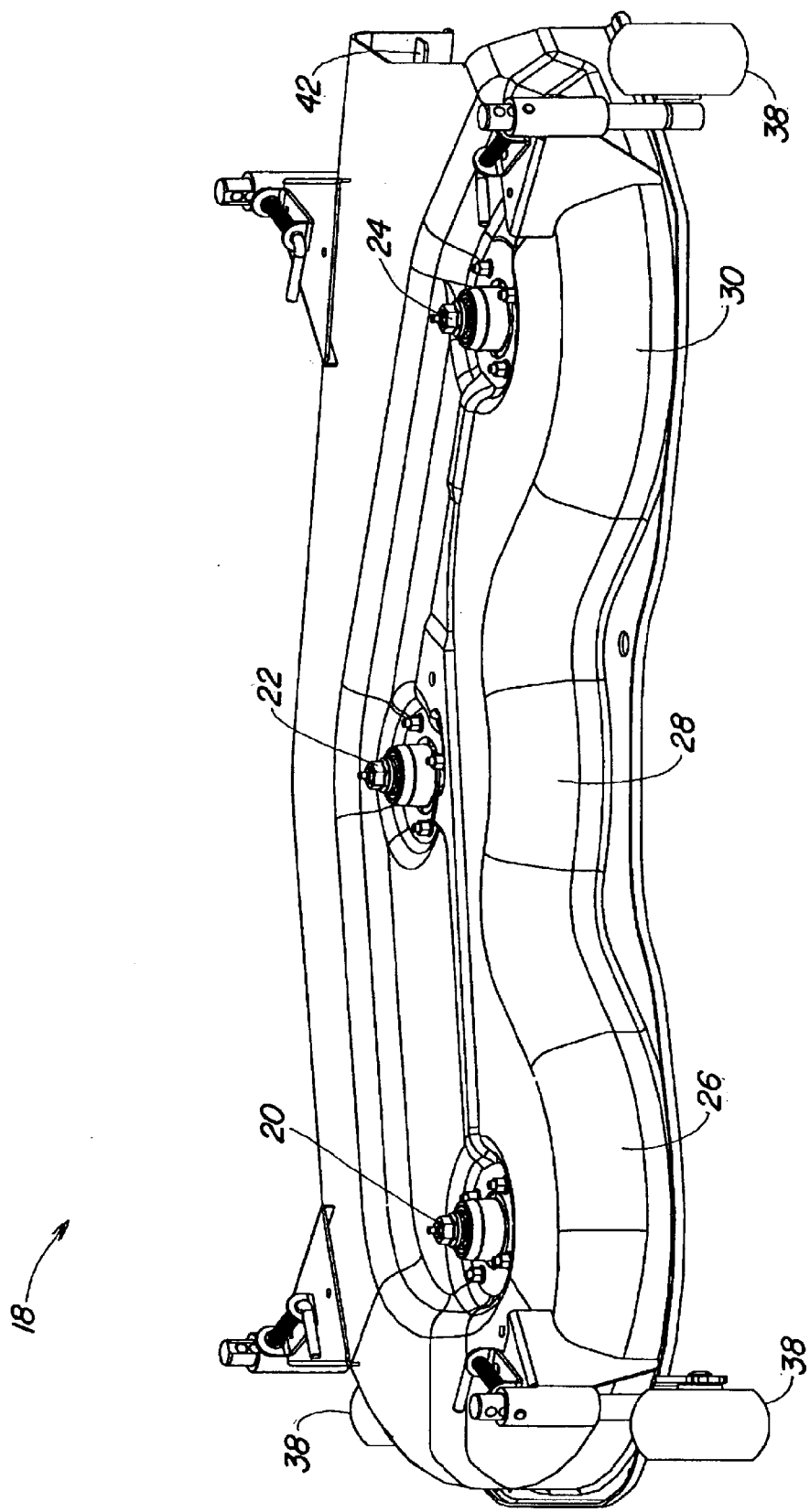
FIG. 2 is a rear perspective view of the deck shown in FIG. 1
Figure 4:
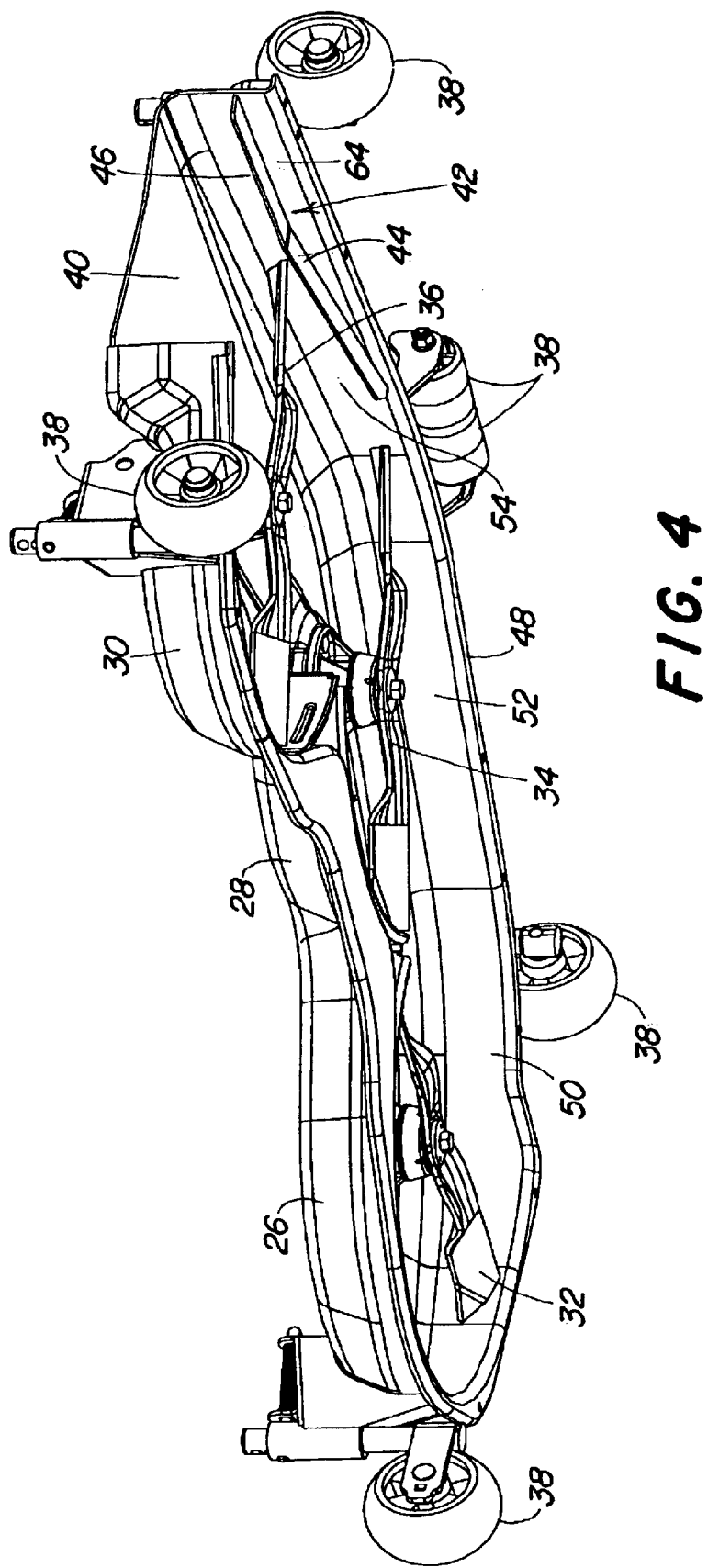
FIG. 4 is a rear and elevated perspective view of the cutting deck showing the inside of each of its cutting chambers, including the blades and baffle strip housed therein.

FIG. 2 more closely illustrates the cutting deck 18 that is shown attached to the tractor 10 of FIG. 1. The deck 18 includes three cutting spindles 20, 22 and 24 that are mounted with three cutting chambers 26, 28 and 30, respectively oriented from left to right, which each house or enclose a blade 32, 34 or 36 therein, as shown in FIGS. 2 and 4. Attached to the front and each of the four corner areas of the deck are anti-scalp wheels 38 used to carry the deck 18 over unexpected changes in elevation in the ground traveled by the tractor 10.

Figure 3:
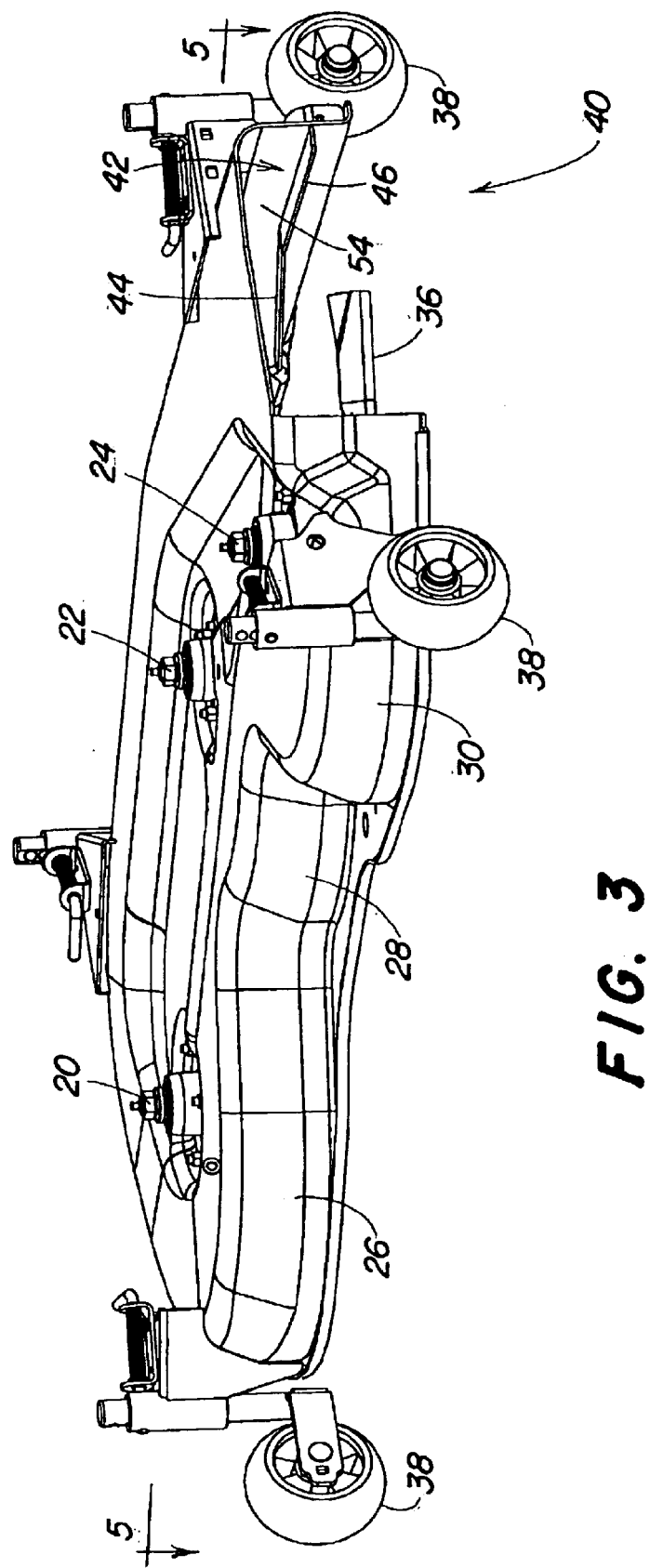
FIG. 3 is a right rear side perspective view of the cutting deck showing the baffle of the present invention through the deck's discharge chute.

FIG. 3 provides a view of the deck 18 similar to that shown in FIG. 2 with the exception that the deck 18 is tilted to the right. The tilt permits the viewer to see through a discharge opening or chute 40 on the right side of the right chamber 30 whereby the opening 40 is provided to permit grass that has been cut to then be expelled or thrown from the implement 18. As seen through the opening 40 in FIG. 3 and also looking to FIG. 4, it will be seen that the deck 18 includes a baffle in the form of an elongated strip 42 having first and second elongated segments or portions 44 and 46. Portion 44 begins slightly above the cutting plane of the right blade 36 and continues above that plane. Portion 44 continues until it meets portion 46 whereby it, too, maintains a position above the cutting plane of the blade 36. The strip 42 is preferably made of steel or similar hardened material and is mounted to the inside of the center and right chambers 28 and 30.

Figure 5:
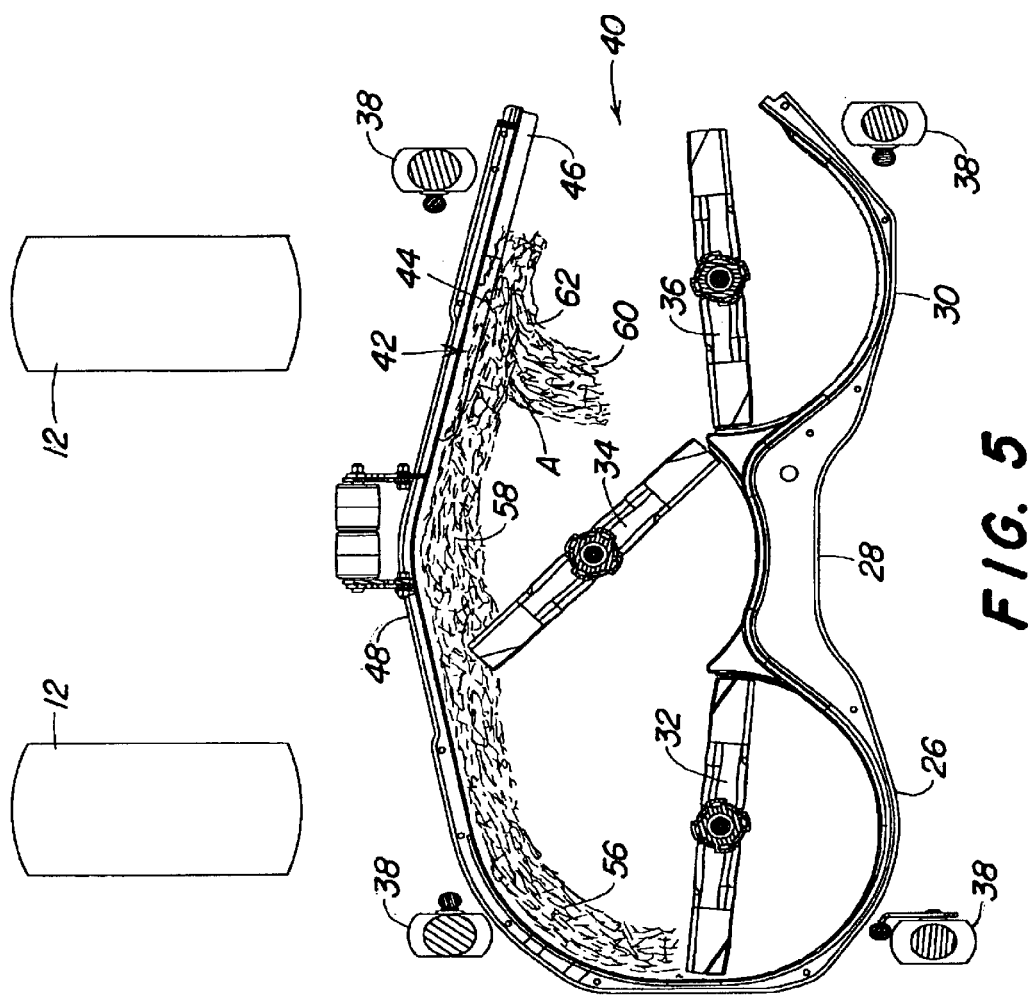
FIG. 5 is a sectional view along lines 5—5 according to FIG. 3 of the inside of the deck's chambers illustrating the substantial flow of air and grass caused by each of the blades as they rotate.

FIG. 4 illustrates the underside of the deck 18. With this perspective, the inside of each of the chambers can be seen. As part thereof, each of the respective left, center and right chambers 26, 28 and 30 includes a front wall 50, 52 and 54, respectively. As shown in FIG. 5, as each of the three blades 32, 34 and 36 rotates to both lift and cut the grass beneath it, a series of respective streams 56, 58 and 60 of air and grass, such as those shown in FIG. 5, are created and flow from the tip of their respective blade edges. As each of the streams 56, 58 and 60 leaves its respective blade, it follows a curved path resulting from the rotation of that blade. This path causes the streams 56, 58 and 60 to be thrust against the front walls 50, 52 and 54.

Looking to FIG. 5, as the streams 56 and 58 approach a point A where the center and right chambers 28 and 30 border each other, they combine to form a stream 62. Stream 62 then meets with the stream 60 of air and grass caused by rotation of the right blade 36. When they meet, streams 62 and 60 merge and create an area of turbulence that begins in the area of point A and extends across the width of the right chamber 30. This turbulence then reduces the uplifting capability of the right blade and, accordingly, prevents grass that has previously been ran over by the tractor's right front tire from being lifted or straightened. The term straightened is intended to describe the ability of the grass to stand up or flex back into an upright stance after it has been flattened by the tire.

As shown in FIG. 4, the strip 42 is angled upwardly and positioned laterally inwardly from the front wall 54 to intercept the combined stream 62. In doing so, the strip 42 will substantially redirect the turbulence created by the clashing or joining together of combined stream 62 and right stream 60. Redirection occurs along a ramped incline formed by the strip's portions 44 and 46 so as to permit the stream 62 to flow quickly and smoothly through and from the deck 18, while the majority of stream 60 is thrown underneath the strip 42 and eventually exits through the opening 40. With this redirection, the grass preceding the cutting path of the right chamber 30 is permitted to straighten in a void area 64 created by the strip 42 where the stream 62 is substantially not introduced. Upon straightening, the right blade 36 can then properly lift and cut the grass since the stream 62 is not introduced into the area 64. Thereafter, the right blade 36 and rotation caused thereby can then convey the cut grass around a portion of the inside of the right chamber 30 to a point where its stream 60 is then routed underneath the strip 42 and then discharged from the deck 18 at opening 40.

With the instant invention, there is provided a cutting deck that effectively conveys vegetation throughout its interior so as to maximize its cutting ability. Additionally, there is provided a cutting deck that effectively discharges that vegetation once it has been cut in order to leave a pleasing appearance.

Having described the preferred embodiment, it will become apparent that various modifications can be made without departing from the scope of the invention as defined in the accompanying claims.

We claim:

1. A cutting implement usable with a vehicle, the implement comprising:

a) first and second laterally spaced and adjacent cutting chambers, both chambers having an interior surface and an exterior surface, the interior surfaces of both chambers having a front wall;

b) a discharge opening adjacent the first chamber for allowing material to exit the first chamber;

c) a cutting blade housed within each chamber for cutting vegetation in the path of the implement, each of the blades being rotatable so as to define a generally horizontal cutting plane, each of the rotating blades generating a stream of air to convey the cut vegetation outwardly from its edge when it rotates with the stream being directed against and along the front wall; and d) a baffle joined to the front walls of the first and second chambers and including first said second segments with each of the segments being generally above the cutting plane of the blades therein, at least one of the segments being inclined relative to the other thereof to form a ramp along which the stream of the second chamber flows after it leaves the edge of its respective cutting blade.

2. The implement as recited in claim 1 wherein:

the baffle reduces the stream or flow of cut vegetation below its first and second segments to permit the vegetation bent over by the front walls of the first and second chambers to straighten so as to extend into the cutting plane of the blade of at least the second chamber.

3. The implement as recited in claim 1 wherein:

the baffle constricts the area of flow available for the streams directed therealong and routes the stream from the second chamber above the baffle and the stream of the first chamber below the baffle.

4. The implement as recited in claim 3 wherein:

the baffle extends laterally inwardly from the front walls of the chambers.

5. The implement as recited in claim 2 wherein:

the baffle extends laterally inwardly from the front walls of the chambers.

6. A cutting implement usable with a vehicle, the implement comprising:

a) a plurality of adjacent cutting chambers, the chambers being defined in part by a continuous front wall on an interior thereof and each having a top surface therein;

b) a cutting blade housed within each of the chambers, each of the blades being rotatable within its chamber and defining a cutting plane therein for the cutting of vegetation in the path of the implement, each of the blades causing a respective stream of air and vegetation to flow when it rotates and further causing its stream to be directed against and laterally along the front wall of its respective chamber, one of the blades further directing its respective stream along the front wall of an adjacent chamber; and c) a baffle which is joined to the front walls of the adjacent chambers and which includes first and second segments, each segment being generally above the cutting plane of the blades in the adjacent chambers, at least one of the segments being inclined relative to the other thereof to form a ramp along which the stream of one of the chambers flows after it leaves the edge of its respective cutting blade.

7. A cutting implement usable with a vehicle, the implement comprising:

a) first and second laterally spaced and adjacent cutting chambers, both chambers having an interior surface and an exterior surface, the interior surfaces of both chambers having a front wall;

b) a discharge opening adjacent the first chamber in allowing material to exit the first chamber;

c) a cutting blade housed within each chamber for cutting vegetation in the path of the implement, each of the blades being rotatable so as to define a generally horizontal cutting plane, each of the rotating blades generating a stream of air to convey the cut vegetation outwardly from its edge when it rotates with the stream being directed against and along the front wall; and d) a baffle joined to the front walls of the first and second chambers and including first and second portions with each of the portions being generally above the cutting plane of the blades therein, at least one of the portions being inclined relative to the other thereof to form a ramp along which the stream of the second chamber flows after it leaves the edge of its respective cutting blade, the baffle constricting the area of flow available for the streams directed therealong and routing the stream from the second chamber above the baffle and the stream of the first chamber below the baffle.

8. A cutting implement usable with a vehicle, the implement comprising:

a) first and second laterally spaced and adjacent cutting chambers, both chambers having an interior surface and an exterior surface, the interior surfaces of both chambers having a front wall;

b) a discharge opening adjacent the first chamber for allowing material to exit the first chamber;

c) a cutting blade housed within each chamber for cutting vegetation in the path of the implement, each of the blades being rotatable so as to define a generally horizontal cutting plane, each of the rotating blades generating a stream of air to convey the cut vegetation outwardly from its edge when it rotates with the stream being directed against and along the front wall; and d) a baffle joined to the front wails of the first and second chambers and extending laterally inwardly from the front walls of the chambers, the baffle including first and second portions with each of the portions being generally above the cutting plane of the blades therein, at least one of the portions being inclined relative to the other thereof to form a ramp along which the stream of the second chamber flows after it leaves the edge of its respective cutting blade, the baffle constricting the area of flow available for the streams directed therealong and routing the stream from the second chamber above the baffle and the stream of the first chamber below the baffle.

* * * * *